United States Patent [19]

Burdy et al.

[11] 3,932,099

[45] Jan. 13, 1976

[54] MOLD APPARATUS

[75] Inventors: Norbert Burdy; Christian Ravet, both of Givors; Jean Lacave, Marseille, all of France

[73] Assignee: Fives Lille Cail, Paris, France

[22] Filed: Sept. 17, 1973

[21] Appl. No.: 398,016

[52] U.S. Cl. .................................. 425/432; 425/412

[51] Int. Cl.[2] ........................ B29C 3/00; B30B 11/02

[58] Field of Search ...... 425/253, 432, 425; 249/66, 249/68

[56] References Cited

UNITED STATES PATENTS

| | | | |
|---|---|---|---|
| 1,594,842 | 8/1926 | Kramer | 425/253 X |
| 2,566,817 | 9/1951 | Yellin | 249/66 X |
| 3,044,120 | 7/1962 | Wiskoff et al. | 249/68 |
| 3,149,392 | 9/1964 | Ripley | 425/253 X |
| 3,200,465 | 8/1965 | Lassman | 425/422 X |
| 3,407,458 | 10/1968 | Reckman et al. | 425/432 X |
| 3,555,599 | 1/1971 | Weinhold | 425/432 X |
| 3,712,785 | 1/1973 | Hirt et al. | 425/432 X |
| 3,743,468 | 7/1973 | Helmrich | 425/432 X |

*Primary Examiner*—J. Howard Flint, Jr.
*Attorney, Agent, or Firm*—Kurt Kelman

[57] ABSTRACT

Cooperating guide means are provided on a vibratory mold and a cover plate reciprocable into and out of the open top of the mold. The guide means are arranged to guide the cover plate during its vertical stroke just before it enters into the mold and to prevent any but vertical movements between the mold and the cover plate when the cover plate is within the mold. The operative length of the guide means is less than the length of the vertical stroke.

5 Claims, 2 Drawing Figures

MOLD APPARATUS

The present invention relates to improvements in a molding apparatus comprising a vibratory mold having an open top and a cover plate reciprocable through a vertical stroke into and out of the open top of the mold.

In molding apparatus of this type which is useful, for instance, for the manufacture of carbon anodes used in the electrolytic production of aluminum, the mold is filled with the desired particulate material through the open top and the cover plate is then introduced into the mold through the top to press against the material while the mold is vibrated.

It is the primary object of this invention to provide an apparatus of this type which is of simple construction and which permits the length of the molding cycle to be reduced.

The above and other objects and advantages are accomplished in accordance with the invention by cooperating guide means on the mold and the cover plate. The guide means are arranged to guide the cover plate during the vertical stroke just before it enters into the mold and to prevent any but vertical movements between the mold and the cover plate when the cover plate is within the mold. The operative length of the guide means is less than the length of the vertical stroke of the cover plate.

The present invention will become more apparent from the following detailed description of a now preferred embodiment thereof, taken in conjunction with the accompanying drawing wherein.

Figure 1:
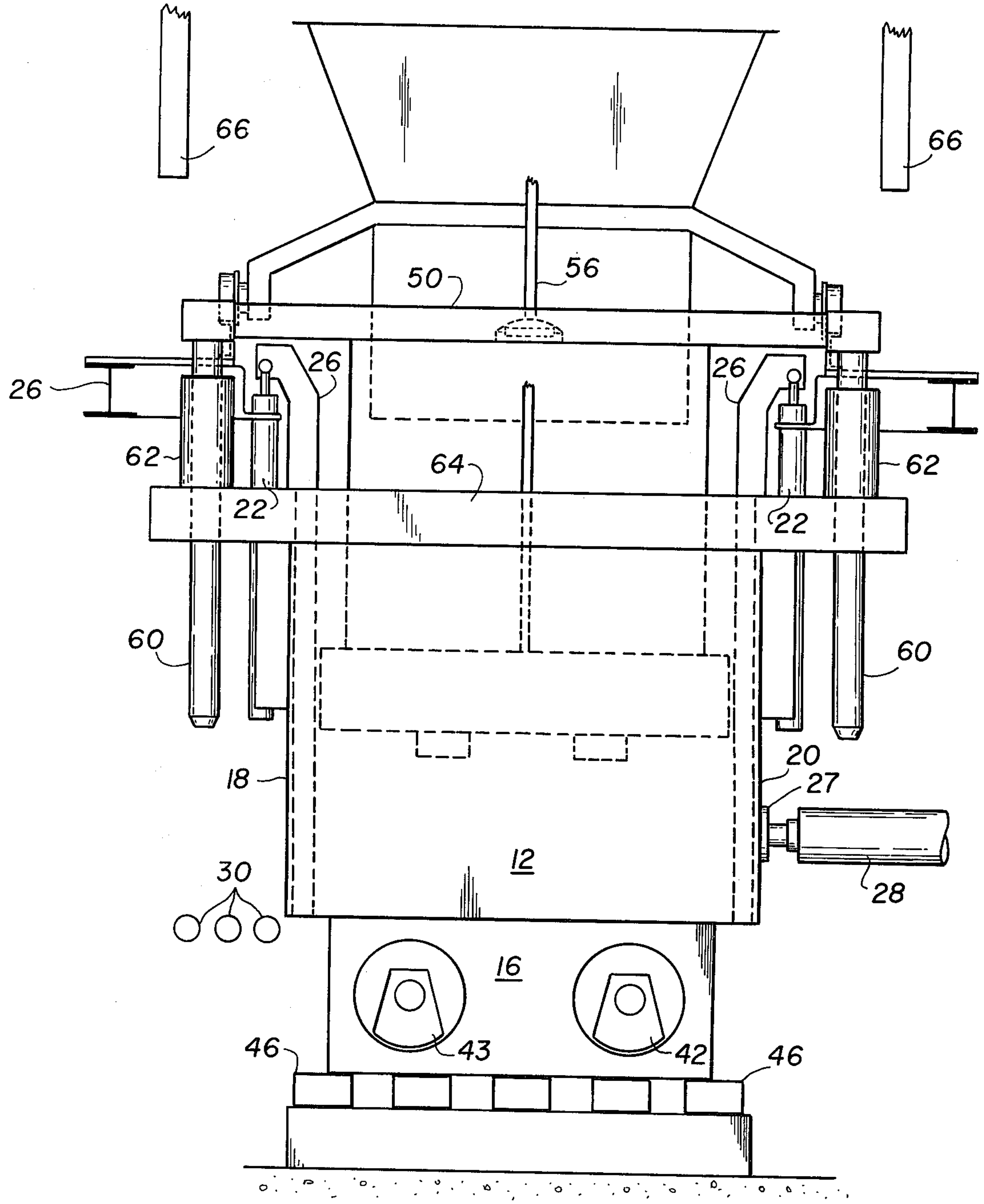
Figure 2:
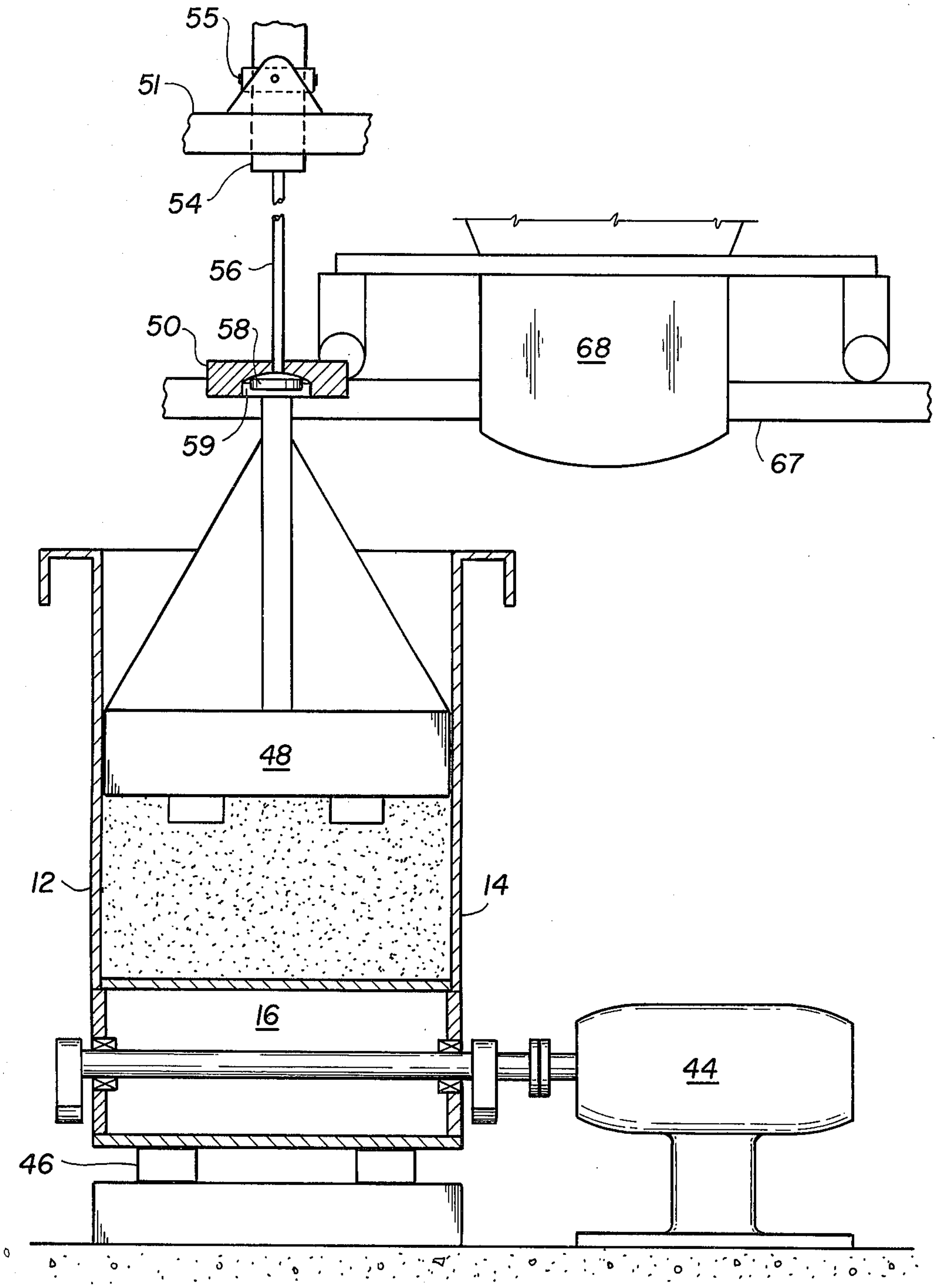

FIG. 1 is a side elevational view of a molding apparatus according to this invention; and FIG. 2 is a side elevational view of the apparatus viewed at 90° from the view of FIG. 1, partly in section.

Referring now to the drawing, the illustrated molding apparatus is shown to comprise a mold of rectangular cross section two of whose side walls are constituted by vertical panels 12, 14 rigidly affixed to a vibratory support 16 and braced at their upper ends. The two other side walls of the mold are constituted by doors or gates 18, 20 whose edge slide in vertical guideways at the adjacent edges of panels 12, 14. The doors are opened and closed by hydraulic jacks 22 mounted on fixed frame 24. As shown, the jack cylinders are carried by the frame while the piston rods of the jacks are linked with some play to flanges 26 affixed to, or integral with, the doors whereby the transmission of the vibrations of the mold to the jacks is avoided.

To enable the molded product to be removed from the mold, with the doors 18 and 20 open, a thrust or pushing device is disposed adjacent the mold. This device is constituted in the illustrated embodiment by vertical plate 27 affixed to the piston rod of a horizontal hydraulic jack 28 mounted on a stationary support (not shown) in front of door 20. After the molding operation is completed, the mold doors are opened and the jack is operated to push the molded product out of the mold onto roller conveyor 30 mounted adjacent door 18 on the level of the mold bottom. The conveyor then moves the molded product away from the mold. Obviously, other transport means for the molded product may be used.

Two rotary shafts 42 carrying unbalanced weights 43 are mounted in the vibratory support 16 and are rotated by motor 44 to impart vibrations to the support. The support rests on two rows of springs or rubber blocks 46.

A heavy cover plate 48 is rigidly affixed to beam 50 which, in turn, is mounted on hydraulic jack 54 hanging on frame 51 so that the cover plate may be reciprocated through a vertical stroke into and out of the open top of the mold.

Beam 50 is mounted on lifting jack 54 by means of a universal joint connecting the lower end of rod 56 to the beam, the universal joint comprising joint part 58 mounted on the lower rod end and mounted with play in a recess 59 in the cover plate beam 50. The joint part 58 has a spherical surface cooperating with a like spherical surface of the recess, as clearly shown in FIG. 2. The upper end of rod 56 may be linked to the piston rod of lifting jack 54, or the rod 56 may constitute the piston rod. Fixed frame 51 supports the lifting jack which is mounted thereon by means of cardan joint 55. The universal joints between the cover plate mounting and the lifting jack and between the lifting jack and its support permit the cover plate to be freely oriented and prevent the vibrations to which it is submitted during the molding operation to be transmitted to the lifting jack.

According to the present invention, cooperating guide means are provided on the mold and the cover plate. The guide means are so arranged that the cover plate is guided during the vertical stroke just before it enters the mold to facilitate its movement thereinto and any but vertical movements are prevented between the mold and the cover plate when the cover plate is within the mold. The operative length of the guide means is less than the length of the vertical stroke.

The illustrated guide means comprises vertical guide rods 60 rigidly fixed to, and extending from, the cover plate beam 50 and cooperating with bushings 62 carried by frame 64 rigidly affixed to the upper edges of mold side wall panels 12 and 14. Obviously, this arrangement could be reversed, i.e. the guide rods may be affixed to the mold and the bushings to the cover plate.

The length of the guide rods is so selected that the guide rods enter into the bushings, i.e. guide the vertical movement of the cover plate, just before the cover plate 48 enters into the mold through the open top thereof. When the cover plate is outside the mold, its vertical movement is guided by guideways 66, 66 affixed to a support frame.

Hopper 68 is mounted on rollers on horizontal rails 67 mounted on support frame 24 and has an openable bottom for feeding molding material through the open top of the mold. A hydraulic jack (not shown) is arranged to move the hopper into and out of vertical alignment with the mold to facilitate the delivery of molding material thereto and remove the hopper after the mold has been filled and during the molding cycle when the cover plate is lowered into the mold.

What is claimed is:

1. A molding apparatus comprising 1. a vibratory mold having an open top,
2. a beam,
3. a cover plate rigidly affixed to the beam and reciprocable through a vertical stroke into and out of the open top of the mold,
4. a frame affixed to the mold, and
5. cooperating guide means on the mold and the cover plate, the guide means being arranged to guide the cover plate during the vertical stroke just before it enters into the mold and to prevent any but vertical movements between the mold and the cover plate when the cover plate is within the mold, the guide means comprising a. vertical guide rods carried by the beam and having an operative length less than the length of the vertical stroke of the cover plate, and b. vertical bushings cooperating with the guide rods, the vertical bushings being mounted on the frame and the length of the bushings being such that the guide rods enter into the bushings just before the cover plate enters into the mold.

2. A molding apparatus comprising 1. a vibratory mold having an open top,
2. a cover plate reciprocable through a vertical stroke into and out of the open top of the mold,
3. cooperating guide means on the mold and the cover plate, the guide means being arranged to guide the cover plate during the vertical stroke just before it enters into the mold and to prevent any but vertical movements between the mold and the cover plate when the cover plate is within the mold, the operative length of the guide means being less than the length of the vertical stroke,
4. a lifting means for the cover plate,
5. a fixed support for the lifting means, and 6. universal joints respectively mounting the cover plate on the lifting means and the lifting means on the support.

3. The molding apparatus of claim 2 further comprising a beam rigidly carrying the cover plate, the universal joint between the lifting means and the cover plate comprising a joint part connected to the lifting means and mounted with play in a recess in the cover plate beam, the joint part having a spherical surface cooperating with a spherical surface of the recess.

4. The molding apparatus of claim 2, further comprising fixed guide members for guiding the cover plate only during the upper part of its vertical stroke.

5. The molding apparatus of claim 2, further comprising a beam, the cover plate being rigidly affixed to the beam, and a frame affixed to the mold, and the cooperating guide means comprises vertical guide rods carried by the beam and having an operative length less than the length of the vertical stroke of the cover plate, and vertical bushings cooperating with the guide rods, the vertical bushings being mounted on the frame, and the bushings being so disposed that the guide rods enter into the bushings just before the cover plate enters into the mold.

* * * * *